United States Patent [19]

Fukunaga et al.

[11] 4,365,311
[45] Dec. 21, 1982

[54] CONTROL OF INSTRUCTION PIPELINE IN DATA PROCESSING SYSTEM

[75] Inventors: Yasushi Fukunaga; Tadaaki Bandoh, both of Hitachi, Japan

[73] Assignee: Hitachi, Ltd., Tokyo, Japan

[21] Appl. No.: 938,346

[22] Filed: Aug. 31, 1978

[30] Foreign Application Priority Data

Sep. 7, 1977 [JP] Japan ............................ 52-106702

[51] Int. Cl.³ .............................................. G06F 9/28
[52] U.S. Cl. ...................................................... 364/900
[58] Field of Search ... 364/200 MS File, 900 MS File; 235/92 SH; 328/37, 48; 307/221 R

[56] References Cited

U.S. PATENT DOCUMENTS

| | | | |
|---|---|---|---|
| 3,346,851 | 10/1967 | Thornton | 364/200 |
| 3,609,391 | 9/1971 | Hatano | 328/37 |
| 3,656,123 | 4/1972 | Carnevale | 364/200 |
| 3,736,567 | 5/1973 | Lotan et al. | 364/200 |
| 3,753,232 | 8/1973 | Sporer | 364/200 |
| 3,792,362 | 2/1974 | Grant | 307/215 |
| 3,840,861 | 10/1974 | Amdahl et al. | 364/200 |
| 4,025,771 | 5/1977 | Lynch, Jr. et al. | 364/200 |
| 4,077,011 | 2/1979 | Mathis | 364/900 |
| 4,079,456 | 3/1978 | Lunsford et al. | 364/200 |
| 4,110,822 | 8/1978 | Porter et al. | 364/200 |
| 4,153,941 | 5/1979 | Caddell | 364/900 |
| 4,155,120 | 5/1979 | Keefer | 364/200 |

*Primary Examiner*—Raulfe B. Zache
*Assistant Examiner*—David Y. Eng
*Attorney, Agent, or Firm*—Antonelli, Terry & Wands

[57] ABSTRACT

In a data processing system having an instruction pipeline in which each instruction is allotted for execution, part by part, to segments provided in the instruction pipeline so that the first segment executes a part of one instruction allotted thereto, while the successive segments execute respective parts of the preceding instructions allotted thereto, a control of the instruction pipeline is arranged to provide the segments with individual reference clock signals whose timings are determined separately depending on the capacity of each segment for execution of the allotted part of each instruction and also variable depending on the actual condition of the system in execution of each instruction.

10 Claims, 7 Drawing Figures

# CONTROL OF INSTRUCTION PIPELINE IN DATA PROCESSING SYSTEM

BACKGROUND OF THE INVENTION

This invention relates to a control of the instruction pipeline in a data control system.

In a data processing system having an instruction pipeline, each pipeline has a plurality of segments and each instruction is allotted for execution, part by part to the segments. The pipeline processing of instructions in a data processing system of the type as described above is disclosed in, for example, U.S. Pat. No. 3,840,861 issued Oct. 8, 1974 to G. M. Amdahl et al entitled "Data processing System having an Instruction Pipeline for Concurrently Processing a Plurality of Instructions". In the known pipeline processing, the operations of the respective segments are controlled on the basis of the same clock signal having a specific frequency and several cycles of the reference clock signal are supplied to each segment for execution of allotted processes at generally different steps in each instruction by that segment. The period of one cycle is determined depending on the time required for each segment to execute its work to be completed in one cycle. Since the time depends on the segments, the period of one cycle must be determined to be equal to or larger than the maximum one of the times required for the respective segments. Accordingly, this degrades the processing efficiency of the whole system. For example, in the case where the period of one cycle must be at least 100 ns for a segment A while 150 ns for a segment B and where the segments A and B require, respectively five cycles and three cycles for execution of the allotted parts of an instruction, the period of one cycle of the reference clock signal by which the operation of both the segments A and B are controlled must be equal to or longer than 150 ns. Since all the segments must finish their processing before the pipeline processing starts execution of the next instruction, if both the segments A and B are controlled by the same reference clock signal having a period of 150 ns, the segment A finishes its processing in 150 ns×5=750 ns and the segment B in 150 ns×3=450 ns. Therefore, 750 ns is needed for one operation cycle. However, if the segment A is controlled by a reference clock having a period of 100 ns and the segment B by a reference clock having a period of 150 ns, then the segments A and B finish their processing in 100 ns×5=500 ns and 150 ns×3=450 ns, respectively so that one operation cycle can be reduced to 500 ns. This saves 250 ns.

Also, the period of one cycle required for each individual segment to execute its process which includes reading of information from a memory must be longer than where it does not include reading of any information. Accordingly, in a mini-computer such as a machine-control computer which is relatively simple in construction and flexible in use, the timing is performed in such a manner that the clock signal is temporarily held at the time when the reading from the memory is started and the clock signal is resumed after finishing the reading from the memory. If a pipeline processing is performed in this manner, the start of the memory reading commanded by a segment holds the clock signal so that the operations of other segments which are controlled by the same clock signal and do not need the memory reading are also held, with the result that the processing time is prolonged.

SUMMARY OF THE INVENTION

The object of this invention is to provide an improved pipeline control in a data processing system having an instruction pipeline, in which the operations by individual clock signals whose one-cycle periods are determined in accordance with the nature of the process to be executed by the respective segments.

According to this invention, there are provided individual reference clock signal generator means which generate separate reference clock signals having respective one-cycle periods, corresponding to the contents of the process to be executed by the respective segments in the instruction pipeline of the data processing system.

According to another aspect of this invention, the one-cycle period of each clock signal associated with each segment is made variable according to the content of the processing.

DESCRIPTION OF THE PREFERRED EMBODIMENTS

Figure 1:
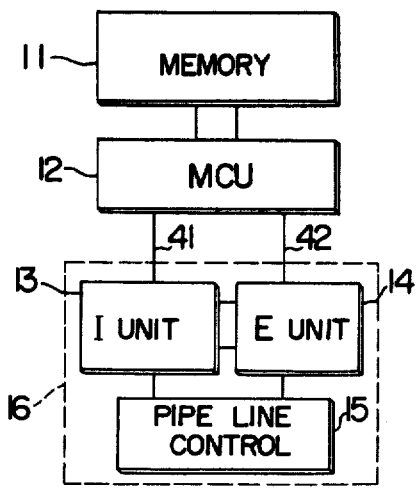
FIG. 1 shows in block diagram the general outline of a constitution of a data processing system having an instruction pipeline.

Reference is first made to FIG. 1 showing the outline of a data processing system having an instruction pipeline. A main memory (MEMORY) 11 is controlled by a memory control unit (MCU) 12 to transfer data to a processor 16 or write therein data from the processor 16. The processor 16 comprises plural segments for pipeline processing of instructions. The embodiment shown in FIG. 1 has two segments, i.e. I-unit (I UNIT) 13 for instruction fetching such as reading of instruction, decoding, arithmetic processing of effective address etc, and E unit (E UNIT) 14 for instruction execution. The processor 16 also has a pipeline controller (PIPELINE CONTROLLER) 15. The respective units are connected through data buses 41 and 42 with a memory control unit 12 and the data transfer between the units and the main memory 11 is made through the data buses 41 and 42.

Figure 2:
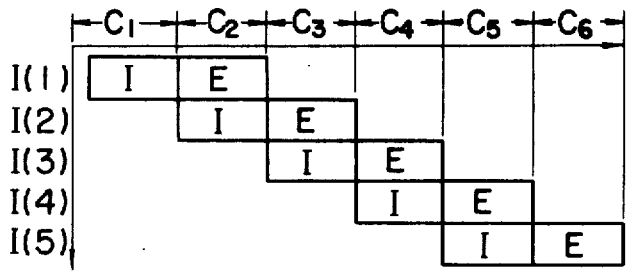
FIG. 2 shows a time chart illustrating the executions of instructions by the respective segments according to the pipeline processing in the system shown in FIG. 1.

FIG. 2 shows the time divisions for processing of instructions in the instruction pipeline by the respective segments or units. In FIG. 2, the case is illustrated where five instructions I(1), I(2), I(3), I(4) and I(5) are processed. First, at the period $C_1$, the I unit 13 executes reading, and decoding of the instruction I(1) and determination of an effective address. After the determination of the effective address by the I-unit has been finished, the E unit 14 starts the execution of the instruction I(1) at the next period C₂. Simultaneously, the I-unit reads and decodes the next instruction I(2) and determines an effective address thereof. When the execution of the instruction I(1) by the E-unit, and the execution of the instruction I(2) by the I-unit are all finished, both the I- and E-units 13 and 14 are allowed to start their next processings. At the period C₃, the unit I executes reading and decoding of the instruction I(3), and determination of the effective address thereof while the E-unit executes the instruction I(2). Similar series of operations follow with respect to the instructions I(4) and I(5).

Figure 3:
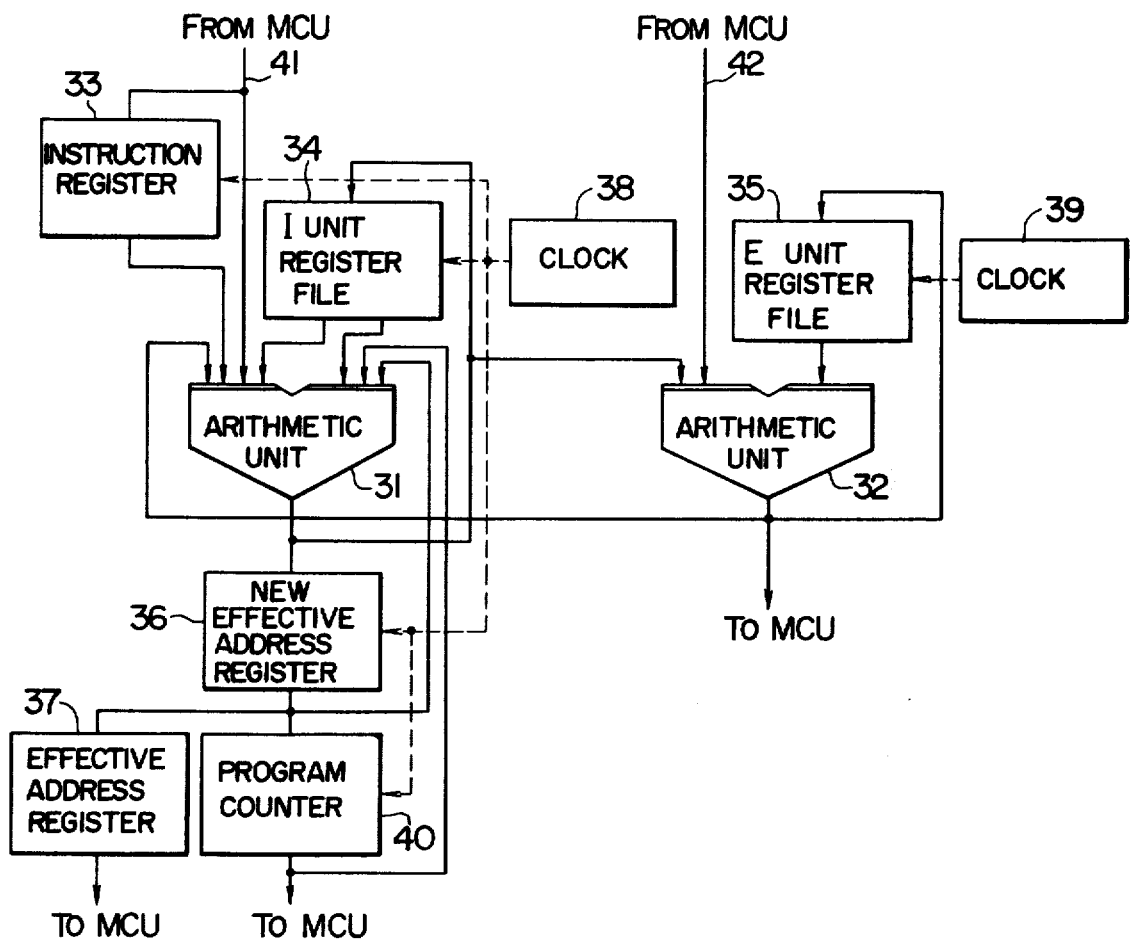
FIG. 3 shows in block diagram an embodiment of a processor used in the data processing system shown in FIG. 1.

FIG. 3 shows in block diagram the details of a portion of the processor 16 shown in FIG. 1, especially illustrating the I- and E-units. The left-hand half of the figure corresponds mainly to the I-unit and the right-hand half of the figure to the E-unit. An arithmetic unit 31 is provided for the I-unit and an arithmetic unit 32 for the E-unit. An instruction register 33 serves to temporarily store the instruction sent through the data bus 41 from the memory control unit 12. An I-unit register file 34 includes base registers and an index registers and serves to temporarily store address information obtained by the arithmetic unit 31. An E-unit register file 35 serves to temporarily store data information obtained by the arithmetic unit 32. The circuit shown in FIG. 3 further comprises a new effective address register 36, an effective address register 37, and a program counter 40. The operations of the registers and the counter will be described later.

The I-unit is provided with a clock signal generator 38 for exclusive use with the I-unit. The clock signal generator 38 generates a clock signal for controlling the timing of the operation of the registers 33 and 36, the file 34 and the counter 40. The E-unit is provided also with a clock signal generator 39 for exclusive use with the E-unit. The clock signal generator 39 controls the timing of the operation of the file 35.

The operation of the processor will next be explained. The program counter 40 in FIG. 3 renews its content, each time one instruction has been executed, to designate the next instruction to be executed. The content of the program counter 40 is sent to the memory control unit (MCU). The instruction read out of the main memory in accordance with the content of the program counter 40 is sent to the I-unit through the data bus 41 and stored in the instruction register 33. The I-unit calculates the effective address EA on the basis of the contents of the instruction in the following manner.

For example, it is assumed that an instruction is expressed in terms of a short word consisting of 16 bits, as given below.

Here, OP represents an operation code; B a code indicating the identification number of a specific base register, consisting of, for example, 3 bits. Especially, for example, "000" of the code B indicates no base register is to be modified and "111" designates the program counter. DISP is a code for specifying displacement, which may be of 8 bits indicating a value by which the content (B) of the base register designated by the code B is to be modified. The effective address EA is calculated by the arithmetic unit 31 as follows.

$$EA = (B) + DISP$$

On the other hand, when an instruction is given by a long word consisting of 32 bits as below.

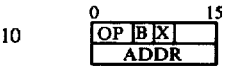

Here, OP and B are the same codes as those discribed above; X a code indicating the identification number of an index register; and ADDR an address specifying code indicating the amount of modification required to obtain an effective address. The effective address is obtained, in the arithmetic unit 31, by modifying the sum of the content (X) of the register designated by the index register code X and the content (B) of the register designated by the base register code B, with ADDR. Namely, the effective address EA is given by the following expression.

$$EA = (B) + (X) + ADDR$$

The effective address EA thus obtained is written in the new effective address register 36. The newly obtained effective address EA (NEW) is stored there until the E-unit finishes its operation then transferred into the effective address register 37 or immediately, if the E-unit has already finished its operation, transferred into the effective address register 37. Simultaneously, the program counter 40 has its content renewed to designate the next instruction. In this manner, one operation cycle in execution of an instruction by the I-unit is completed.

The above one operation cycle may correspond to the period C₁ allotted to the I-unit for execution of the instruction I(1) in the instruction sequence in FIG. 2, while the E-unit remains resting. At the next period C₂, the I-unit executes the instruction I(2) in the like manner while the E-unit executes the instruction I(1) in accordance with the effective address EA (OLD) previously transferred from the new effective address register 36 to the effective address register 37. That is, the effective address EA (OLD) is supplied to the memory control unit (MCU) and the instruction is processed in the well-known manner, on the basis of the content read out of the main memory and the indication by an instruction word given by the register file 35.

It is now assumed that the I-unit needs five cycles of the reference clock signal, each cycle being equal to 160 ns, and the E-unit requires 4 cycles of the reference clock signal, each cycle being equal to 200 ns, to execute the above described processing. If the same reference clock signal is used to control both the I- and E-units, the one-cycle period of the reference clock signal must be set to 200 ns. Accordingly, the I-unit requires 1000 ns and the E-unit 800 ns to execute each instruction so that the whole system requires 1000 ns for execution of each instruction. According to this invention, the I- and E-units are independently supplied respectively with a reference clock signal having a period of 160 ns and a reference clock signal having a period of 200 ns. Therefore, each of the I- and E-units requires 800 ns for execution of each instruction so that the whole system also requires 800 ns for the same purpose.

Figure 4:
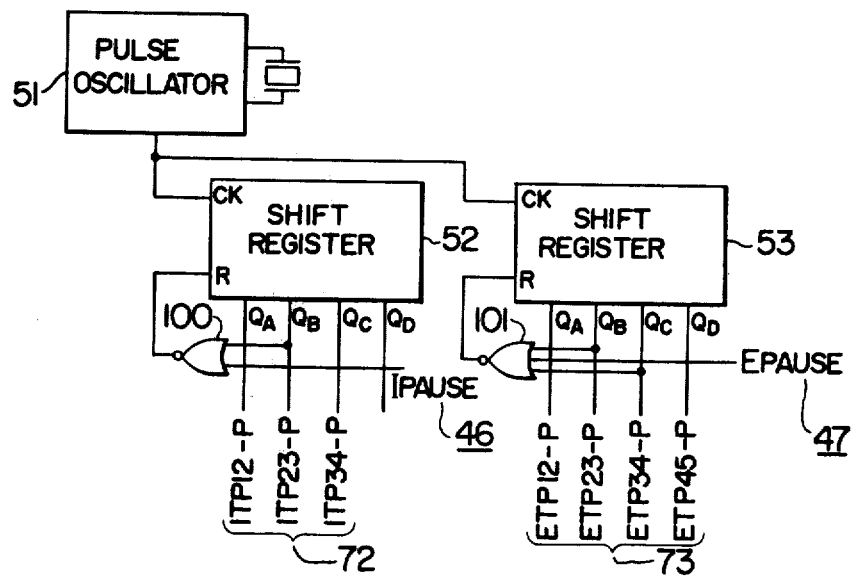
FIG. 4 shows a concrete example of a reference clock signal generating circuits including two clock signal generators used in respective segments.

FIG. 4 shows a clock control circuit for generating two reference clock signals having different periods. Since the one-cycle period of the reference clock signal for the I-unit is expressed by 160 ns=4×40 ns, while the one-cycle period of the reference clock signal for the E-unit is expressed by 200 ns=5×40 ns, the oscillation frequency of a pulse oscillator 51 is determined at 25 MHz so as to give a period of 40 ns. The output of the pulse oscillator 51 is supplied to the clock terminals CK of an I-unit shift register 52 and an E-unit shift register 53, which may be S194 type IC made by Texas Instruments Inc. Each shift register has four output terminals $Q_A$, $Q_B$, $Q_C$ and $Q_D$ each producing a signal of high level "1" or low level "0". With application of each timing pulse to the terminal CK, the signals at $Q_B$, $Q_C$ and $Q_D$ take new levels the same as the old signal levels at $Q_A$, $Q_B$ and $Q_C$, respectively, while the signal at $Q_A$ takes high or low level depending on whether the level at R is high or low, respectively. The combination of the signals from two of these output terminals decides the timing of the reference clock signal in a manner as mentioned below with reference to FIG. 5. It should be noted that only selected ones of the outputs from the four output terminals may be used for producing the timing signals, as the case may be. For example, in the I-unit shift register, only the outputs from the terminals $Q_A$, $Q_B$ and $Q_C$ are used for the purpose.

Figure 5:
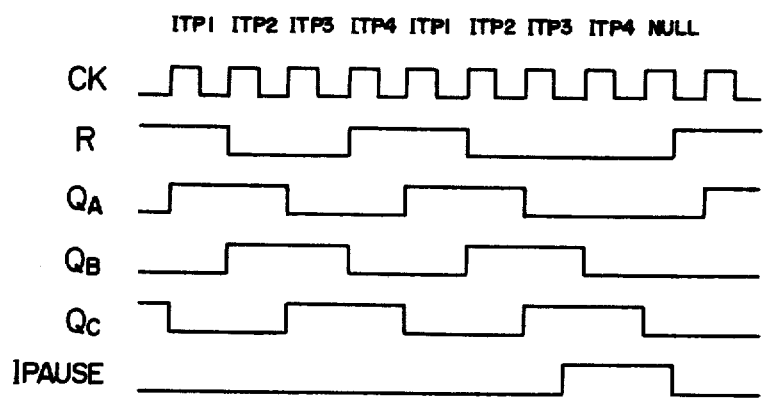
FIG. 5 shows the timings of the reference clock signals generated by the generator of I-unit shown in FIG. 4.

First, in the shift register 52 for the I-unit, assuming that the signals "IPAUSE" and "$Q_B$" are both at low level so that the input R goes high level through the gate 100, the signal $Q_A$ goes to high level upon application of a timing pulse to the terminal CK. With the next timing pulse to the terminal CK, the signal $Q_A$ remains high level and the signal $Q_B$ comes high level, as shown in FIG. 5, which changes the terminal R to low level. As a result, with application of another timing pulse to the terminal CK, the signal $Q_A$ changes to low level, while the signals $Q_B$ and $Q_C$ take high level. Such operation is repeated with application of the timing pulses to the terminal CK. Thus, so long as the signal "IPAUSE" is at low level, each of the signals at $Q_A$, $Q_B$ and $Q_C$ changes its level with application of every two timing pulses so that the levels of the signals $Q_A$, $Q_B$ and $Q_C$ are offset one timing pulse from each other, as shown in FIG. 5.

By using these signals, the reference clock for I-unit is determined to have four stages, i.e. ITP1 when $Q_A$ is at high and $Q_B$ is at low, ITP2 when both $Q_A$ and $Q_B$ are at high, ITP3 when both $Q_B$ and $Q_C$ are at high and ITP4 when both $Q_A$ and $Q_B$ are at low. These clock timings are used to control the operation of the I-unit. For example, the new effective address register is set at the stage ITP4 when both $Q_A$ and $Q_B$ are at low and the calling for memory reading is set at ITP1. If a longer clock timing is required, it is achieved by using ITP123 produced with OR condition of the signals $Q_A$ and $Q_B$.

Next, the explanation will be made of the signal IPAUSE. Assuming that $Q_A$ and $Q_B$ are at low, if the signal IPAUSE goes high level, the level at R goes low level, which inhibits the level of the signal $Q_A$ from being high level upon application of the timing pulse to the terminal CK. As a result, the reference clock pulse is prevented from advancing to the regular timing ITP1 and is shifted to "NULL" state. This situation will occur when the I-unit finishes its operation cycle, while the E-unit does not yet complete its operation cycle.

The shift register 53 for the E-unit has the same connection as that for the I-unit as above-mentioned except for the connection of the outputs $Q_B$ and $Q_C$ to the NOT-OR circuit 101. With this different connection of the outputs, the reference clock for the E-unit provides five timing stages of ETP1, ETP2, ETP3, ETP4 and ETP5 for one operation cycle.

In the above embodiment, when the I- and E-units require different numbers of clock cycles to finish the execution of each instruction, the processing time required by the whole system can be reduced by using individual reference clock signals whose one-cycle periods are separately determined in accordance with the processing capacities of the respective units.

Next, a second embodiment of this invention will be described. In this embodiment, the I- and E-units have the same processing capacity, and hence the reference clock signals for the respective units may have the same one-cycle period. In such a case, while one of the units is reading information out of the main memory, the one cycle period of the associated reference clock signal is prolonged to temporarily hold the processing by that unit whereas the processing by the other unit is continued in accordance with the regular timing of the associated reference clock signal, so that the processing time required by the whole system can be reduced.

For example, at the period $C_2$ of the operation cycle in the instruction sequence in FIG. 2, the read of the instruction I(2) is called for in accordance with the content of the program counter 40 in the I-unit. Accordingly, the reference clock signal 38 for the I-unit is held still, that is, the one-cycle period of the clock pulse at that time is prolonged. On the other hand, the E-unit calls for reading from the main memory information required in accordance with the effective address stored in the effective address register so that the reference clock signal 39 for the E-unit is also temporarily interrupted. If the memory calls by the effective address register and the program counter are processed with the same memory cycle time and the same access time, the responses from the main memory return simultaneously. Otherwise, however, one response will lead the other.

In the case where the response to the memory call by the program counter is faster than that to the memory call by the effective address register, the reference clock signal 38 for the I-unit is resumed to set the data sent through the data bus 41 into the instruction register 33. If the instruction I(2) is a long word one consisting of two words, the content (B) of the base register designated by the base register designating field of the instruction register 33 is added in the arithmetic unit 31 to the content (X) of the index register designated by the index register designating field of the instruction register 33 and the result of the addition is set in the new effective address register 36. In this case, the new effective address register 36 is used as a temporary register for temporarily storing the sum of the contents (B) and (X) of the base register and the index register. Since the instruction I(2) is a long word, it is necessary to read the code ADDR out of the main memory so as to obtain an effective address. For this purpose, the program counter is advanced by one step at the next machine cycle, the main memory is again called for, and the reference clock signal 38 for the I-unit is held still again.

After the code ADDR has been read out of the main memory, the reference clock generator for the I-unit starts its operation so that the read code ADDR is added in the arithmetic unit 31 to the sum (B)+(X) of the contents of the base register and the index register previously stored in the new effective address register 36. The sum (B)+(X)+ADDR is then set as the effective address EA of the instruction I(2) into the new effective address register 36.

Also, the operation of the reference clock signal generator for the E-unit is temporarily held, when there occurs a call for reading of the main memory during the operation of the E-unit, so that the one-cycle period of the clock signal is prolonged. The reference clock signal generator resumes its operation with completion of the reading from the main memory. The read data which address is specified by the effective address register 37 is sent through the data bus 42 to the arithmetic unit 32 to be added to the content read out of the accumulator provided in the register file 35. The result of the addition is again written in the accumulator. This operation puts an end to the execution of the instruction I(1). If at this time the calculation of the effective address of the instruction I(2) is already finished by the I-unit, the execution of the instruction I(2) is started by the E-unit. However, if the calculation is not yet finished, the operation of the E-unit stops temporarily.

Figure 6:
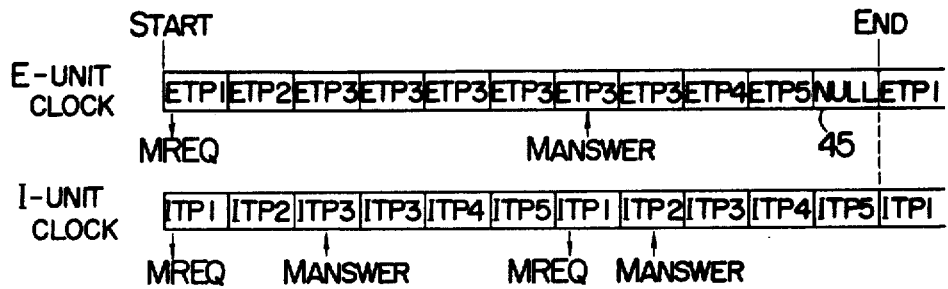
FIG. 6 shows how the period of the clock signal is changed when a segment requires memory reading.

FIG. 6 shows how the one operation cycle periods of the reference clock signals for the E- and I-units are prolonged during the times required for memory read during the execution of the instruction I(1) and during decoding of the instruction I(2) and calculation of the effective address thereof. In the reference clock signals for both the E- and I-units shown in FIG. 6, five timing pulses correspond to one cycle of the reference clock signal. If the call is for memory read, the operation of the associated clock signal generator is held still upon occurrence of the third timing pulse coming after generation of the memory call and restarted when the memory read is completed. However, if the response time for the memory read is short so that the response is given before the occurrence of the third timing pulse after the memory call the operation of the clock signal generator is continued without being held so that the generator produces its clock signal regularly. In the embodiment shown in FIG. 6, since the call for memory read is generated by the effective address register at the timing pulse ETP1, the reference clock for the E-unit is held at the timing pulse ETP3. The generator is released from "hold" when the memory call is responded to. Therefore, the one-cycle period of the reference clock is prolonged to a length of time corresponding to the period of ten timing pulses.

On the other hand, concerning the reference clock signal generator for the I-unit, since the response time for memory read by the program counter is so short that the first reference clock period is made of 6 timing pulses while the second reference clock period is made of five timing pulses without prolongation. Therefore, the I-unit operates two cycles of the reference clock for the I-unit, while the E-unit operates one cycle of the reference clock for the E-unit. The execution of instruction by the E-unit is ended earlier by one timing pulse than that by the I-unit so that the operation of the reference clock for the E-unit is held still during the period of that one timing pulse.

Figure 7:
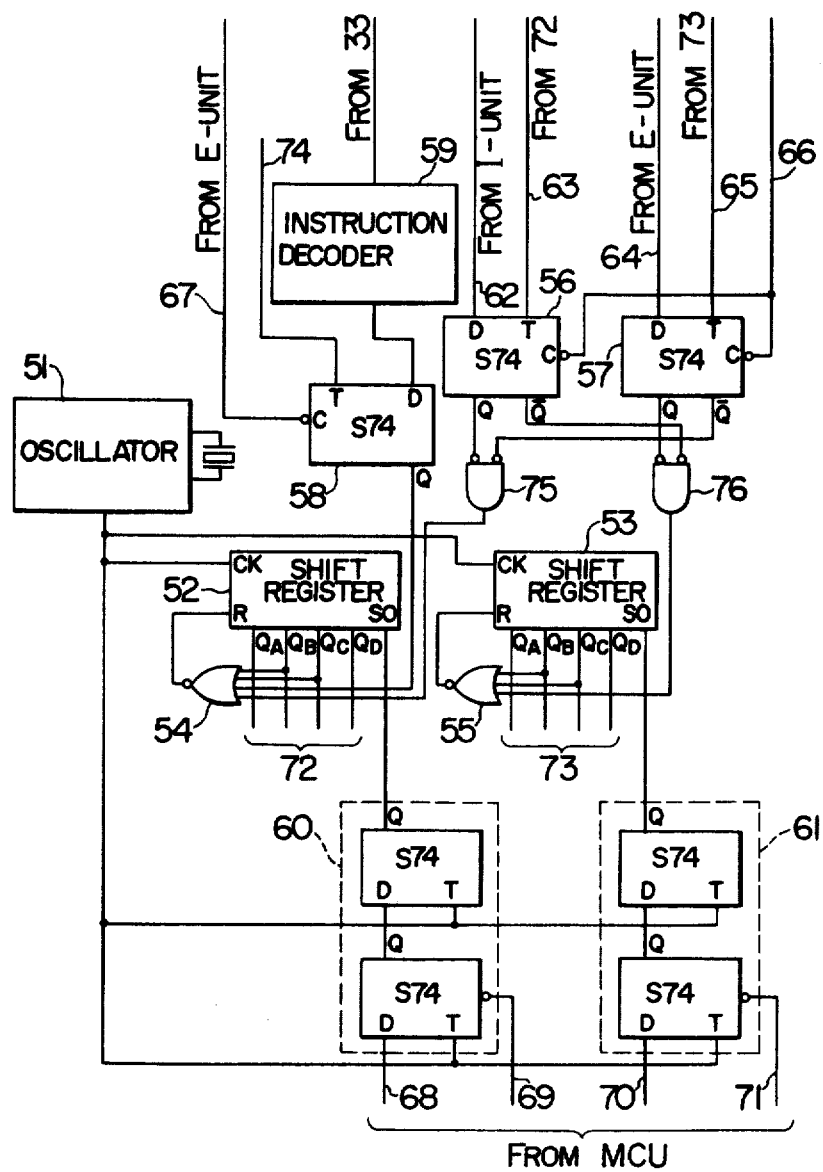
FIG. 7 shows a control circuit for changing the one-cycle period of the reference clock signal.

FIG. 7 shows a clock signal control circuit for generating clock pulse signals as described above. Shift registers 52 and 53 are operated by pulses from a quartz oscillator 51. The shift register 52 serves as a reference clock signal generator for the I-unit and the shift register 53 as a reference clock signal generator for the E-unit. Both of the generators operate to repeat operation cycles with a period of 200 ns, each cycle including five stages of TP1 and TP5. The reference clock generator for the I-unit is held still until an operation end signal 62 produced by the I-unit is set into a flip-flop 56 with application of the I-unit timing pulse ITP4 through the line 63 to the flip-flop 56 and an operation end signal 64 from the E-unit is set into a flip-flop 57 with application of the E-unit timing pulse ETP4 through the line 73. When the I-unit calls for memory reading, a memory call signal 69 is applied from the memory control unit MCU to an I-unit clock stop circuit 60 thereby causing the shift register 52 to hold its operation. When the memory call is responded to, a response signal 68 is applied to the clock stop circuit 60 thereby causing the shift register 52 to be released from the "hold" condition. The hold condition of the reference clock for the I-unit, which continues from the memory call to the memory response, does not affect the operation of the reference clock signal generating circuit for the E-unit.

On the other hand, even though the operation of the E-unit is finished, gates 76 and 55 prevent the reference clock signal generator for the E-unit from advancing to the next reference clock cycle until the operation cycle of the I-unit is finished. This is represented by the NULL state 45 shown in the time chart in FIG. 6.

The operation of the reference clock signal generator for the E-unit are also held by a memory call signal 71 from the E-unit and the hold condition is kept until the generator receives a response signal 70 from the memory. The hold condition of the reference clock for the E-unit also has no influence upon the reference clock signal generating circuit for the I-unit. Accordingly, the I-unit can independently continue its operation even if the E-unit is resting.

There are instruction words which cannot be subjected to the pipeline processing following the sequence as shown in FIG. 2, such as an instruction which requires the result of the processing by the E-unit before it is executed by the I-unit or a conditional branch instruction, the result of whose execution determines the next instruction. In those cases, an instruction decoder 59 judges on the basis of the signal from the instruction register 33 whether the instant instruction is of the type as abovementioned or not. If it is judged to be yes, the instruction decoder 59 delivers a signal for inhibiting the reading of the next instruction so that the flip-flop 58 is set, upon occurrence of the timing pulse ITP4, to temporarily stop the clock signal generator for the I-unit until the processing by the E-unit is finished and an end signal 67 is delivered.

As described above, according to this invention, the periods of the reference clock signals for controlling the processings of data by the respective segments of an instruction pipeline can be independently chosen so that the processing by one segment may balance with the processing by other segments, whereby the processing efficiency of the whole system can be improved.

We claim:

1. A control of an instruction pipeline in a data processing system in which said instruction pipeline is provided with a plurality of segments and each instruction is executed in a plurality of steps by said segments such that each segment executes one or more of the steps allotted thereto relating to a given one instruction during one operation cycle, while a different segment parallely executes different steps allotted thereto relating to a different one instruction in the same operational cycle, said control comprising: means provided for use exclusively by each of said segments for supplying clock signals to control the timing in execution of the respective steps allotted to said each segment, said supplying means comprising means for adjusting, depending on a time period required for said each segment to complete each of the allotted steps, one-cycle period of the clock signal used for controlling the timing in execution of said each allotted step independently of the timing in parallel execution of the different steps by the different segment and means for controlling one-cycle period of at least one clock signal supplied to at least one of said segments so that said segments complete the respective steps allotted to them substantially at the same time in said one operation cycle.

2. A control as claimed in claim 1, wherein said data-processing system includes a main memory, and further comprising means operative, when one of the segments calls for reading information from the main memory, to prolong at least one cycle of said clock signal supplied to said one segment until said information is read out of said memory.

3. A control as claimed in claim 1, wherein said clock signal supplying means comprises a shift register having a clock terminal for receiving timing pulses of a predetermined frequency, a reset terminal and at least three stages in cascade, outputs from selected ones of said stages being connected through a NOR gate to said reset terminal so that one of said stages produces, in response to each timing pulse applied to said clock terminal, a high or low level output signal depending on whether said reset terminal is supplied with a high or low level signal and that the outputs of said stages are shifted, in response to each timing pulse applied to said clock terminal, to the adjacent stages, and means for determining the timing of said timing pulse supplied to said each segment according to the combination of the outputs of at least two of said stages.

4. A control as claimed in claim 3, further comprising means for applying to said reset terminal through said NOR gate a pause signal which is produced when one of said segments calls for reading information from the main memory.

5. A control as claimed in claim 1, wherein said instruction pipeline comprises two segments, one of said segments executing one instruction, while the other segment is fetching the next instruction preparatory to execution thereof and decoding it and said control further comprises means for temporarily holding the operation of said clock signal supplying means for said other segment so as to inhibit said other segment from executing the next instruction selectively depending on the type of said one instruction.

6. A control as claimed in claim 5, further comprising means for releasing the inhibition by said holding means in response to an operation end signal indicative of ending of the operation of said one segment.

7. A control as claimed in claim 1, wherein said instruction pipeline comprises two segments, one of said segments executing one instruction while the other segment is fetching the next instruction and decoding it.

8. A control of an instruction pipeline in a data processing system in which said instruction pipeline is provided with two segments and each instruction is executed in a plurality of steps by said segments such that one segment executes one or more of the steps allotted thereto relating to a given one instruction during one operation cycle, while the other segment parallely executes different steps allotted thereto relating to a different one instruction in the same operational cycle, said control comprising: means provided for use exclusively by each of said two segments for supplying clock signals to control the timing in execution of the respective steps allotted to said each segment, said supplying means comprising means for adjusting, depending on a time period required for said one segment to complete each of the allotted steps, one-cycle period of the clock signal used for controlling the timing in execution of said each allotted step independently of the timing in parallel execution of the different steps by the said other segment and means for controlling one-cycle period of at least one clock signal supplied to at least one of said segments so that said complete segments the respective steps allotted to them substantially at the same time in said one operation cycle.

9. A control of an instruction pipeline comprising at least plural segments in a data processing system wherein said system performs data processing according to programmed instructions, said instructions requiring different numbers of steps of processing time and each instruction is processed sequentially by a segment provided in said instruction pipeline, said control comprising:
first means provided for each of said segments for generating a reference clock signal to control the timing of the operation of said each segment; and
second means for defining one-cycle periods of the clock signal generated by said clock signal generating means according to the time required for each segment to execute its respective instruction; and
gate means for preventing advance to the next reference clock cycle by the first means for one segment until the operation cycle of the first means for a second segment is finished.

10. A control of an instruction pipeline in a data processing system in which said instruction pipeline is provided with a plurality of segments and each instruction is executed in a plurality of steps by said segments such that each segment executes one or more of the steps allotted thereto relating to a given one instruction during one operation cycle, while a different segment parallely executes different steps allotted thereto relating to a different one instruction in the same operational cycle, said control comprising: means provided for use exclusively by each of said segments for supplying clock signals to control the timing in execution of the respective steps allotted to said each segment, said supplying means comprising means for adjusting, depending on a time period required for said each segment to complete each of the allotted steps, one-cycle period of the clock signal used for controlling the timing in execution of said each allotted step independelty of the timing in parallel execution of the different steps by the different segment and means for controlling the time period of at least one cycle period of said clock signal supplied to at least one of said segments so that the end of the execution of said instruction by said one segment substantially coincides with the end of the execution of the next instruction by said other segment.

* * * * *